United States Patent [19]

Akiyama et al.

[11] 4,331,541

[45] May 25, 1982

[54] FIBER-SUPPORTED ION EXCHANGER

[75] Inventors: Hiroshi Akiyama, Ichikawa; Hideo Naotsuka, Omiya, both of Japan

[73] Assignee: Rohm and Haas Company, Philadelphia, Pa.

[21] Appl. No.: 126,274

[22] Filed: Mar. 3, 1980

[30] Foreign Application Priority Data

Feb. 20, 1979 [JP] Japan .................................. 54-17827

[51] Int. Cl.³ ............................................. B01D 15/04
[52] U.S. Cl. .................................... 210/679; 210/681; 210/683; 521/29; 521/32; 521/33
[58] Field of Search ........................ 210/679, 681–688; 521/29, 31–33, 38

[56] References Cited

U.S. PATENT DOCUMENTS

| | | | |
|---|---|---|---|
| 3,876,565 | 4/1975 | Takashima et al. | 521/29 |
| 3,944,485 | 3/1976 | Rembaum et al. | 521/29 |
| 4,007,138 | 2/1977 | Kanig | 521/29 |
| 4,224,415 | 9/1980 | Meitzner et al. | 521/29 |

*Primary Examiner*—Ivars C. Cintins
*Attorney, Agent, or Firm*—John E. Taylor, III

[57] ABSTRACT

Ion exchange materials are prepared by retaining a vinyl monomer solution within the interstices of a fiber structure, such as a woven or non-woven fabric, polymerizing these monomers in the presence of an organic solvent sparingly soluble or totally insoluble in water to form a macroreticular polymer, and functionalizing the macroreticular polymer with an ion exchange functional group.

17 Claims, No Drawings

FIBER-SUPPORTED ION EXCHANGER

This invention relates to a method for manufacturing an ion exchanger having a matrix structure of polyolefin fibers, and more particularly to a method for manufacturing an ion exchanger which comprises causing a monomer solution to be retained in a macroporous structure of fibers in the presence of a polymerization initiator and an organic solvent sparingly soluble or totally insoluble in water, subjecting the monomers to in-situ polymerization in an aqueous medium, and thereafter introducing an ion-exchange group into the resultant polymer.

Ion exchangers formed of polyvinyl monomers or mixed monovinyl and polyvinyl monomers, particularly those based on styrene, are generally granular in form, and measure between about 0.300 mm (50 mesh) and about 1.20 mm (16 mesh) in particle diameter. They are generally manufactured by suspension (dispersion) polymerization. The largest particle diameters which may be manufactured practically by such a polymerization process are limited by the largest stable monomer droplets that form in the aqueous suspension; this is about 1.4 mm (14 mesh).

The field in which uses are found for ion exchangers has expanded to a point where polymeric ion exchangers in larger particle sizes, or in special shapes, such as large sheets, large tubes and the like, are needed for special uses. These exchangers must be physically and chemically stable, and must possess practical levels of ion exchange capacity.

Japanese Unscreened patent publication No. 20390/1977 discloses a method which comprises the steps of causing a monomer mixture (divinylbenzene, either styrene or vinylbenzyl chloride, and a polymerization initiator) to be fixed in a structure of fibers incapable of being swelled or dissolved at least at the temperature at which the mixture polymerizes, allowing the mixture to be polymerized in-situ in the fiber structure, removing from the resultant polymer the fiber component by either decomposition or dissolution, and thereafter introducing an ion-exchange group into the remaining polymer. More often than not, this ion exchanger must undergo an additional treatment such as cutting and shaping after the polymerization step. The particle size or shape in which this ion exchanger is formed, however, does not necessarily fulfill the requirements mentioned above. A method has been proposed for manufacture of large-particle-size ion exchangers, which comprises causing a mixture of polymerization initiator and monomers to be deposited in a fiber matrix, subjecting the mixture as deposited in the matrix to polymerization, and thereafter introducing an ion-exchange group into the resultant polymer. While this method produces ion-exchangers with large, controllable particle shape, it fails to produce ion exchangers with the desired properties. Since by this method the functional group is introduced directly into the copolymer, the copolymer swells significantly upon functionalization. As a consequence of this swelling, strain is generated along the interface between the fiber substrate and the copolymer, which leads to separation of the copolymer from the fibers. The ion exchanger produced by this method, therefore, suffers from poor physical strength. This method is incapable of providing a product with satisfactory physical properties.

A method has now been discovered which permits the successful manufacture large-particle-size ion exchangers, and which is free from the disadvantages mentioned above. The method of the present invention comprises the following three steps:

(1) causing a mixed solution of polyvinyl monomers or polyvinyl and monovinyl monomers to be retained in a macroporous structure of fibers in the presence of a polymerization initiator and an organic solvent which is sparingly soluble or totally insoluble in water, (2) subjecting the monomers retained in the fiber structure to polymerization in an aqueous medium, and (3) introducing an ion-exchange group into the resulting polymer.

It is important to the present invention that, in the first step of the above method, the monomer solution is retained in a structure of intertwined fibers in such a way that large interstices are permitted to occur between adjacent fibers. While the above-mentioned Japanese Unscreened patent publication No. 20390/1977 discloses the polymerization of monomers adsorbed within the fibers, the method of the present invention causes the polymer to be retained in the interstices formed between the adjacent fibers. As a result, during the introduction of the ion-exchange group the fine pores present in the copolymer absorb the strain generated at the interface between the fibers and the copolymer. Consequently, the ion exchanger of the present invention does not separate at the interface between the fiber and the copolymer, and possesses significantly greater physical strength than the ion exchangers of the prior art, as described above. The shape and size of the ion exchange material prepared according to the method of the present invention may be freely selected with a view to end-use requirements, rather being restricted by the requirements of the preparation method.

The structure formed of the fibers and used as the matrix for the ion exchanger of the present invention must possess proper interstices between the adjacent fibers, and it also must have superior chemical resistance and sufficient mechanical strength for the structure to retain its original shape during the agitation required for polymerization in the aqueous medium. The fibers may be formed into structures which include woven fabrics and non-woven fabrics. It is particularly desirable that these fibers should be cut to the desired size and shape prior to use in the method of this invention. The fibers which may be used to form the fiber structures of the present invention include both natural fibers such as wool, linen, cotton, cellulose and the like, and more preferably synthetic fibers such as modified cellulose, polyamides, acrylics, polyolefins including polyethylene and polypropylene, polyesters, polyurethanes, glass fibers and fluorocarbons. Still more preferred are the polyolefin fibers, and most preferred are polyethylene and polyethylene fibers.

The monomers usable in the method of the present invention are polyvinyl monomers or mixtures of monovinyl monomers and polyvinyl monomers. Examples of monovinyl monomers suitable for use in the present invention include aromatic monovinyl monomers such as styrene, methyl styrene, ethyl styrene, chlorostyrene and vinylbenzyl chloride, and aliphatic monovinyl monomers such as methyl acrylate, ethyl acrylate, butyl acrylate, methyl methacrylate, ethyl methacrylate and butyl methacrylate. Examples of polyvinyl monomers usable in this invention include aromatic polyvinyl monomers such as divinylbenzene, trivinylbenzene, divinyltoluene and divinylxylene, and aliphatic polyvinyl monomers such as ethylene glycol diacrylate, ethylene glycol dimethacrylate and divinyl adipate. The selection of other suitable monomers is well within the ability of one skilled in the preparation of polymers for ion exchange purposes.

The polymerization initiator used in the process of the present invention should be soluble in the monomer solution. Examples of suitable polymerization initiators include benzoyl peroxide, acetyl peroxide, lauroyl peroxide, cumene hydroperoxide, and azo-bis-isobutyronitrile.

In the practice of the method of the present invention, it is important that the monomer solvent employed be an organic solvent that is sparingly soluble or totally insoluble in water; this solvent is present for the purpose of adjusting the physical behavior of the polymer in the retaining structure.

The organic solvents which meet the above requirements fall within three classes:

(1) organic solvents which are soluble in the monomer used, but are incapable of swelling the polymer which forms in the retaining structure;

(2) organic solvents which are soluble in the monomers, and are capable of swelling the polymer formed in the retaining structure;

(3) organic solvents which are mixtures of the organic solvents of Classes 1 and 2. Generally, solvents of Class 1 are referred to as "precipitants" and those of Class 2 as "swelling agents". All of these solvents function to impart fine pores to the polymer being formed. A more complete discussion of solvents, concentration parameters, and the like in the formation of these fine pores (macroreticular structure) is found in Meitzner et al., U.S. Pat. No. 4,224,415. The solvents of Class 1 include iso-octane, n-butanol, t-aminoethanol, methyl isobutyl carbinol, n-heptane, 2-ethylhexanol, and sec-butanol. The solvents of Class 2 include hydrocarbons such as benzene, toluene, xylene and ethylbenzene, and halogenated hydrocarbons such as ethylene dichloride, propylene dichloride, trichloroethane and carbon tetrachloride. Other organic solvents which are usable include those prepared by dissolving linear polymers such as polystyrene, polymethylstyrene, polyacrylic esters and polymethacrylic esters in the above-mentioned organic solvents and homogenizing the resulting mixtures. The degree of polymerization of the linear polymer employed in such solutions is not specifically limited. In actual practice, it is preferable to remove the linear polymer from the crosslinked polymer by extraction.

In the process of the present invention, the first step of entraining the solution of monomer, organic solvent and polymerization initiator in the fiber structure is generally accomplished by immersing the fiber structure in the solution and thereafter drawing the excess solution off the wet fiber structure. This procedure has the advantage of allowing the fiber structure to retain the largest volume of solution in the shortest reasonable time span. The fiber structure entraining the solution is then dispersed in an aqueous solution or an aqueous solution containing a dispersant; the dispersion is then stirred and heated to induce polymerization of the monomer mixture within the fiber structure. The polymerization is carried out in the aqueous solution because of the ease with which the temperature of polymerization can be controlled. Alternatively, the polymerization may be performed by dispersing the fiber structure in advance in an aqueous solution, or an aqueous solution incorporating a dispersant, and adding the monomer solution dropwise to the aqueous solution while agitating to induce polymerization. In either case, the amount of aqueous solution need only be sufficient to permit uniform agitation of the fiber structure in the reaction container. Amounts of aqueous solution 2 to 8 times the total weight of the monomer solution and the fiber structure is sufficient. The critical requirement for polymerization temperature is that it be higher than the decomposition temperature of the polymerization initiator. The preferred polymerization temperature is generally from about 50° to about 100° C.

The step of introducing the ion-exchange group into the polymer thus formed in the fiber structure may involve any of the known ion-exchange functionalization reactions. For example, a cation-exchange resin is obtained by sulfonating an aromatic polymer with sulfuric acid, chlorosulfonic acid or sulfur trioxide, either directly or in the presence of an organic solvent capable of swelling the entrained polymer, and an anion-exchange resin is obtained by chloromethylating an aromatic polymer with chloromethyl methyl ether or hydrochloric acid, methanol and formalin, and subsequently aminating the chloromethylation product with amines such as trimethylamine, dimethylethanolamine, ethylenediamine, or diethylenetriamine. In some cases, as where the entrained polymer is derived from vinylbenzyl chloride, the polymer may be aminated directly. Where an aliphatic ester polymer is the entrained polymer, a cation-exchange resin may be obtained by hydrolyzing the ester linkage. An anion-exchange resin may be obtained by further aminating the resulting cation-exchange resin.

The following examples are intended to illustrate the invention, but not limit it, except as it is limited in the claims. All percentages and proportions given herein are by weight unless otherwise specified, and all reagents are of good commercial quality except as otherwise specified.

EXAMPLE 1

Styrene and divinylbenzene as monomers, benzoyl peroxide (hereinafter referred to as BPO) as a polymerization initiator, and methyl isobutyl carbinol (hereinafter referred to as MIBC) as an organic solvent, in the proportions indicated in Table I were placed in a reaction flask and stirred to achieve a homogeneous mixture. A needle non-woven polypropylene fabric, manufactured by Chisso Corporation and marketed under the trademark "Hi-Separay HS-300" was cut into 30-mm squares and a 10-g sample of these squares was added to each of the mixtures, followed by 500 g of water containing 2.5 g of polyvinyl alcohol as a dispersant. The contents of the reaction flask were then agitated and heated to 80° C. to induce polymerization. The heating was continued to distill the MIBC from the reaction system, and the fabric containing the resulting polymer was removed from the flask, washed thoroughly with water, and dried at 105° C. for 12 hours. The resulting product was squares of a white product, which were approximately 31 to 32 mm on a side. The product was tested for porosity, specific surface area and yield, and the results are shown below in Table II.

TABLE I

| Materials Used (g) | Test Run No. | | | | | |
|---|---|---|---|---|---|---|
| | 1 | 2 | 3 | 4 | 5 | 6 |
| Styrene | 46 | 32 | 24 | 0 | 46 | 92 |
| Divinylbenzene* | 4 | 18 | 26 | 50 | 4 | 8 |
| MICB | 50 | 50 | 50 | 50 | — | — |
| BPO | 0.5 | 0.5 | 0.5 | 0.5 | 0.25 | 0.5 |

*57% pure divinylbenzene additionally containing 41% of ethylvinylbenzene and 2% of other impurities.

TABLE II

| Item of Test | Test Run No. | | | | | |
|---|---|---|---|---|---|---|
| | 1 | 2 | 3 | 4 | 5 | 6 |
| Porosity $cm^3/g$ | 0.32 | 0.46 | 0.80 | 0.91 | 0 | 0 |
| Specific Surface Area ($m^2/g$) | 18 | 56 | 80 | 128 | 0 | 0 |
| Yield (g) | 57 | 58 | 58.8 | 57.5 | 56 | 108 |

Test Run Nos. 1-4 were in accordance with this invention, while Test Run Nos. 5-6 produced materials which were not macroporous, and consequently were not in accordance with this invention.

EXAMPLE 2

The products of Example 1 were sulfonated according to the following procedure. A 10-g portion of the product was placed in a flask and 300 g of 98% sulfuric acid was added; the mixture was heated and maintained at 120° C. for six hours to induce sulfonation. At the end of the reaction period, water was added dropwise through a dropping funnel to hydrate the sulfonation product and dilute the remaining sulfuric acid. This procedure was repeated until the sulfuric acid concentration fell below 0.5%. An aqueous 10% solution of caustic soda was similarly added dropwise to neutralize the sulfonation product and convert it to the sodium ion form. In each case the resulting product was a yellowish brown, strongly acidic cation-exchange resin; the squares measured from about 32 to about 36 mm on a side and 3 to 4 mm in thickness. The yield and physical properties of these materials are shown in Table III.

TABLE III

| Item of Test | Product of Run No. (Example 1) | | | | | |
|---|---|---|---|---|---|---|
| | 1 | 2 | 3 | 4 | 5 | 6 |
| Neutral Salt capacity (meq/g) | 2.35 | 2.65 | 2.10 | 1.46 | 1.40 | 1.07 |
| Water content (%) | 63.0 | 58.1 | 56.2 | 53.3 | 53.0 | 52.4 |
| Yield (g) | 32 | 30 | 30 | 28 | 29 | 28 |
| Separation of polymer from filter *1 | None | None | None | None | Yes | Yes |
| Physical Strength *2 | 3 | 0 | 2 | 2 | 35 | 42 |

*1 Test by appearance
*2 Obtained by passing acid (1N-HCl) and alkali (1N-NaOH) through the sample for 50 cycles under the pressure of 3 to 4 kg/cm², determining exchange capacity before and after the passage, and finding loss of exchange capacity due to passage.

It is clear from the Above Table III that the strongly acidic cation exchangers produced in accordance with the present invention process better properties than those produced without a macroreticular structure.

EXAMPLE 3

The products of Example 1 were chloromethylated and aminated according to the following procedure. A 10-g portion of the product of Example 1 was transferred to a flask, 100 g of ethane dichloride and 100 g of methyl chloromethyl ether were added, and the mixture was allowed to stand for 30 minutes; subsequently, 20 g of anhydrous zinc chloride was added, the mixture was heated to 45° C. and maintained at that temperature for seven hours to chloromethylate the sample. Following the reaction, the mixture was washed with cold water to decompose the excess methyl chloromethyl ether and zinc chloride, and then was washed again with water. The chloromethylation product was aminated with an aqueous, 30% solution of trimethylamine, to produce 36 g of yellowish brown ion-exchange material. This product was tested for anion-exchange capacity, water, and physical properties; the results are shown in Table IV.

TABLE IV

| Item of Test | Product of Run No. (Example 1) | |
|---|---|---|
| | 2 | 5 |
| Neutral Salt Capacity (meq/g) | 1.36 | 1.32 |
| Water Content (%) | 58 | 52 |
| Separation of Polymer From Fiber | No | Yes |
| Physical Properties *2 | 3 | 40 |

*1 and *2; Same as those indicated below Table III.

These anion exchange materials were alternatingly saturated with 1 N hydrochloric acid and 1 N sodium hydroxide solutions for 50 cycles. In this test, neither layer separation nor degradation of ion-exchange capacity occurred in the sample prepared according to the present invention, while the sample prepared without a macroreticular structure showed layer separation of the polymer from the retaining structure, and significant degradation of ion-exchange capacity.

EXAMPLE 4

In a flask, 26 g of styrene, 14 g of divinylbenzene (57% divinylbenzene, balance largely ethylvinylbenzene), an effective amount of BPO as a polymerization catalyst and 60 g of toluene were mixed to form a homogeneous solution. A non-woven polypropylene fabric, manufactured by Japan Vilene Co., Ltd. and marketed under the trademark "STB-1ON," was cut into 30-mm squares, and 10-g samples of the squares were added to the monomer mixture. To the mixture 500 g of water containing 2.5 g of polyvinyl alcohol as a dispersant was added, the contents of the flask were agitated while heating to 75° C. and maintaining at that temperature for 8 hours to allow polymerization. After the polymerization reaction was complete, the toluene was removed by distillation, and the product was thoroughly washed with water and dried at 105° C. for 12 hours to produce 47 g of material in the form of white, square pieces 32 mm on a side. The product material was found to possess a porosity of 0.14 $cm^3/g$ and a specific surface area of 6 $m^2/g$.

This product was sulfonated according to the procedure of Example 2, to produce a strongly acidic cation-exchange material weighing 28 g. This cation-exchange material was found to have a neutral salt capacity of 2.38 meq/g and a water content of 53%. When subjected to the 50-cycle acid-base saturation test described in Example 3, neither separation of the ion exchange polymer from the retaining structure, nor degradation of ion exchange capacity, were observed.

We claim:

1. Ion exchanger comprising a macroporous structure of fibers having interstices between the individual fibers thereof, and disposed within said interstices and adhered to said fibers, a macroreticular, crosslinked polymer derived from polyvinyl monomers or a mixture of monovinyl and polyvinyl monomers and bearing ion exchange functional groups.

2. The ion exchanger of claim 1 wherein the macroporous structure of fibers is a non-woven fabric.

3. The ion exchanger of claim 1 wherein the macroporous structure of fibers is a woven fabric.

4. The ion exchanger of claim 1 wherein the ion exchange functional group is a cation exchange group.

5. The ion exchanger of claim 1 wherein the ion exchange functional group is an anion exchange group.

6. The ion exchanger of claim 1 wherein the fibers are synthetic fibers.

7. The ion exchanger of claim 6 wherein the synthetic fibers are polyolefin fibers.

8. The ion exchanger of claim 7 wherein the polyolefin fibers are polyethylene fibers.

9. The ion exchangers of claim 7 wherein the polyolefin fibers are polypropylene fibers.

10. A method for the manufacture of an ion exchanger which comprises:
(a) causing a solution containing polyvinyl monomers or a mixture of monovinyl and polyvinyl monomers to be retained in the interstices between the fibers of the macroporous structure of fibers in the presence of a polymerizing initiator and an organic solvent sparingly soluble or totally insoluble in water;
(b) polymerizing in an aqueous medium the monomer retained in the interstices between the fibers of the fiber structure; and
(c) introducing an ion exchange group into the resultant polymer.

11. The method of claim 10 wherein the oganic solvent sparingly soluble or totally insoluble in water is methyl isobutyl carbinol.

12. The method of claim 10 wherein the organic solvent sparingly soluble or totally insoluble in water is toluene.

13. The method of claim 10 wherein the fibers are synthetic fibers.

14. The method of claim 13 wherein the synthetic fibers are polyolefin fibers.

15. The method of claim 14 wherein the polyolefin fibers are polyethylene fibers.

16. The method of claim 14 wherein the polyolefin fibers are polypropylene fibers.

17. A method for removal of ions from a solution which comprises contacting the solution containing the ions with an ion exchanger comprising a macroporous structure of fibers having interstices between the individual fibers thereof, and disposed within said interstices and adhered to said fibers, a macroreticular, crosslinked polymer derived from polyvinyl monomers or a mixture of monovinyl and polyvinyl monomers and bearing ion exchange functional groups.

* * * * *